United States Patent
Xu et al.

(10) Patent No.: US 10,962,354 B1
(45) Date of Patent: Mar. 30, 2021

(54) SELECTION METHOD OF LOSS CONTROL MATERIALS FOR LOST CIRCULATION CONTROL IN FRACTURED RESERVOIRS BASED ON PHOTOELASTIC EXPERIMENTS

(71) Applicant: Southwest Petroleum University, Chengdu (CN)

(72) Inventors: Chengyuan Xu, Chengdu (CN); Xiaopeng Yan, Chengdu (CN); Yili Kang, Chengdu (CN); Hao Zhang, Chengdu (CN); Haoran Jing, Chengdu (CN); Jingyi Zhang, Chengdu (CN); Chong Lin, Chengdu (CN); Lijun You, Chengdu (CN); Xiaoqing Qiu, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/117,115

(22) Filed: Dec. 10, 2020

(30) Foreign Application Priority Data

Jan. 2, 2020 (CN) .......................... 202010002091.8

(51) Int. Cl.
*G01B 11/16* (2006.01)
*C09K 8/504* (2006.01)
(Continued)

(52) U.S. Cl.
CPC ............ *G01B 11/18* (2013.01); *C09K 8/5045* (2013.01); *E21B 33/13* (2013.01); *G01L 1/24* (2013.01); *G01L 1/241* (2013.01)

(58) Field of Classification Search
CPC ....... G01B 11/18; C09K 8/5045; G01L 1/241; G01L 1/24; G01N 2203/006;
(Continued)

(56) References Cited

U.S. PATENT DOCUMENTS

2014/0367092 A1* 12/2014 Roberson ................ E21B 47/01
166/250.01
2015/0075778 A1* 3/2015 Walters ................ E21B 49/008
166/250.1
(Continued)

FOREIGN PATENT DOCUMENTS

| CN | 102494815 A | 6/2012 |
| CN | 110359898 A | 10/2019 |

*Primary Examiner* — Isiaka O Akanbi

(57) ABSTRACT

The invention relates to a selection method of loss control materials for lost circulation control in fractured reservoirs based on photoelastic experiments. By using the photoelastic material to simulate rigid lost circulation material, obtaining photoelastic images and load curves during a loading process of plugging zones formed by the lost circulation material, selecting the lost circulation material according to structure stability of plugging zones. Based on 'a relationship between structures and performances' and granular matter mechanics, the present method is with high reliable to duly observe distribution and evolution of internal forces in a pressure-bearing process of plugging zones, reveal an instability mechanism of the plugging zone, and optimize the lost circulation material in a targeted manner; the present disclosure based on mesoscopic structure characterization of plugging zones is for a new idea for material selection of deep fractured reservoirs, of good repeatability, simple operation and low economic cost.

4 Claims, 3 Drawing Sheets

(51) Int. Cl.
*G01L 1/24* (2006.01)
*E21B 33/13* (2006.01)

(58) Field of Classification Search
CPC .... G01N 2203/0067; G01N 2203/0069; E21B 33/13; E21B 33/12; E21B 43/261; E21B 43/267
USPC ....... 356/601, 625, 630, 485, 503, 908, 927; 166/250.14; 73/49.8, 783, 821, 862.471, 73/862.629
See application file for complete search history.

(56) References Cited

U.S. PATENT DOCUMENTS

| | | | |
|---|---|---|---|
| 2016/0069174 A1* | 3/2016 | Cannan | E21B 43/267 166/250.1 |
| 2017/0350226 A1* | 12/2017 | Green | C09K 8/80 |
| 2019/0055836 A1* | 2/2019 | Felkl | G01V 99/005 |

* cited by examiner

SELECTION METHOD OF LOSS CONTROL MATERIALS FOR LOST CIRCULATION CONTROL IN FRACTURED RESERVOIRS BASED ON PHOTOELASTIC EXPERIMENTS

CROSS-REFERENCE TO RELATED APPLICATION

This application claims the benefit of priority from Chinese Patent Application No. 202010002091.8 entitled "SELECTION METHOD OF LOSS CONTROL MATERIALS FOR LOST CIRCULATION CONTROL IN FRACTURED RESERVOIRS BASED ON PHOTOELASTIC EXPERIMENTS" and filed on Jan. 2, 2020, the content of which is hereby incorporated by reference in its entire by reference.

BACKGROUND

Technical Field

The present disclosure generally relates to a technical field of loss control materials for lost circulation control during the drilling and completion operations, and relates to a selection method of loss control materials for lost circulation control in fractured reservoirs based on photoelastic experiments.

Description of Related Art

Fractured reservoirs are widely distributed with huge resources and play an extremely important role in oil and gas exploration and development in the world. The developed fractures are provided main seepage channels for the fractured reservoirs, so that loss of working fluid is easy to be occurred due to the existence of the fractures. The working fluid loss is the most serious way of formation damage, and also is one of complex engineering problems that affect safe and efficient drilling for a long time. As the exploration and development is developed under reservoir conditions such as a deep reservoir, a high temperature, a high pressure and a high ground stress, it will further increase difficulty of working fluid loss-control, thereby how to effective control of working fluid loss is particularly important.

A lot of research on mechanisms of loss control is carried out by domestic and foreign researchers. To date, lost circulation control methods in naturally fractured formation mainly include three kinds: adjusting the stress around the wellbore, plugging the lost circulation channels and improving the strength of rock mass. The methods of adjusting the stress around the wellbore include 3 ways, stress cage, increasing the fracture closing stress and increasing the fracture extension stress. For naturally fractured reservoirs, the most commonly used lost circulation control method is to plug the fracture with soluble (acid soluble or oxidation soluble) granular materials and form a plugging zone isolating the pressure transmission. Among them, pressure-bearing capacity of the plugging zone is not only related to composition of the loss control materials itself, but also related to factors of the loss control materials such as a size, a shape, a combination mode and a fluid lubrication. For example, an article of 《Influence of rigid Loss control materials geometry on its Retention Behavior in Fractures》 written by Kang Yili et al. is pointed out that the shape of the rigid lost circulation material is not only to affect retention of the loss control materials in fractures, but also to affect the strength of the plugging zone. However, current loss control materials are selected mostly based on an indoor trial-and-error method, and an internal theoretical basis is still to be further studied, so that the selection method of lost circulation material is not clear. A structural stability of the fractured plugging zone under an environment of high-temperature, high-pressure and high-ground-stress is a key factor to determine control effect of the fracture fractured reservoirs. Most of plugging failure and repeated loss are related to the structural instability of the plugging zone. Structure analysis and performance regulation of the plugging zone have become an important direction of theory and technology development of the lost prevention and mitigation, therefore, there is an urgent need to develop a new method of lost circulation material selection.

SUMMARY

The technical problems to be solved: in view of the shortcomings of the related art, the present disclosure relates to a selection method of loss control materials for lost circulation control in fractured reservoirs based on photoelastic experiments, which can optimize a size and a shape of plugging material with the best bearing capacity and other factors unrelated to composition of the plugging material.

The technical solution adopted for solving technical problems of the present disclosure is:

a selection method of loss control materials for lost circulation control in fractured reservoirs based on photoelastic experiments according to an embodiment of the present disclosure includes the following steps:

(1) selecting photoelastic material to simulate rigid plugging material, and preparing a size same as a size of the rigid plugging material;

(2) determining a shape, a particle size distribution, an addition, a type and an arrangement of the plugging material used in a photoelastic experiment, and performing the photoelastic experiment under a certain loading mode;

(3) recording photoelastic images, and monitoring a relation curve between an applied load and a time during a photoelastic experiment loading process;

(4) obtaining pressure-bearing capacity of a plugging layer of the plugging material, according to the relation curve of the load and the time in the step (3) above, and selecting the plugging material according to the pressure-bearing capacity.

Wherein a particle size distribution, a material type and a proportional relation of the photoelastic experiment material are determined according to the particle size distribution, the material addition and the material type of common plugging material of deep fractured reservoirs. The particle size distribution and the material addition of the photoelastic material are same as a particle size distribution and a material addition of the rigid plugging material in plugging formula, and other types of material used in the photoelastic experiment are same as other types of the plugging material in the plugging formula;

Wherein a loading mode of the photoelastic experiment is determined according to a stress instability mode of deep fractured reservoirs. According to current existing references, shear instability and friction instability of a plugging layer are two basic forms of structural instability of the plugging layer. For stratum fractures dominated by the shear instability, the shear instability process is simulated by applying a vertical load and a horizontal shear load to a simulated plugging layer. The friction instability can also be regarded as a kind of shear instability. By setting a height of a shear block to the maximum, other loading ways are the same as those for the shear instability, that is, the loading ways of the friction instability.

Wherein the arrangement of the photoelastic experimental material is arranged according to a typical plugging layer structure of cracks. The typical plugging layer structure of a target crack can be determined according to a laboratory plugging simulation experiment and discrete element particle flow simulation. Specifically, when the typical plugging layer structure of the target crack is determined, the photoelastic experimental material can be arranged according to the plugging layer structure.

The present disclosure provides the advantages as below.

(1) The present disclosure can optimize a size, a shape, a combination mode and a fluid lubrication of the plugging material through the photoelastic experiment, at the same time, comparing with a trial and error method that an experiment result can obtain after several days to tens of days, the present disclosure can obtain a result only taken a short experimental time and is easy to operate.

(2) The present disclosure further can observe distribution and evolution of internal forces in a pressure-bearing process of the plugging layer, reveal an instability mechanism of the plugging layer, and optimize the plugging material in a targeted manner.

(3) The present disclosure is of good repeatability, simple operation and low economic cost.

DETAILED DESCRIPTION

Figure 1:
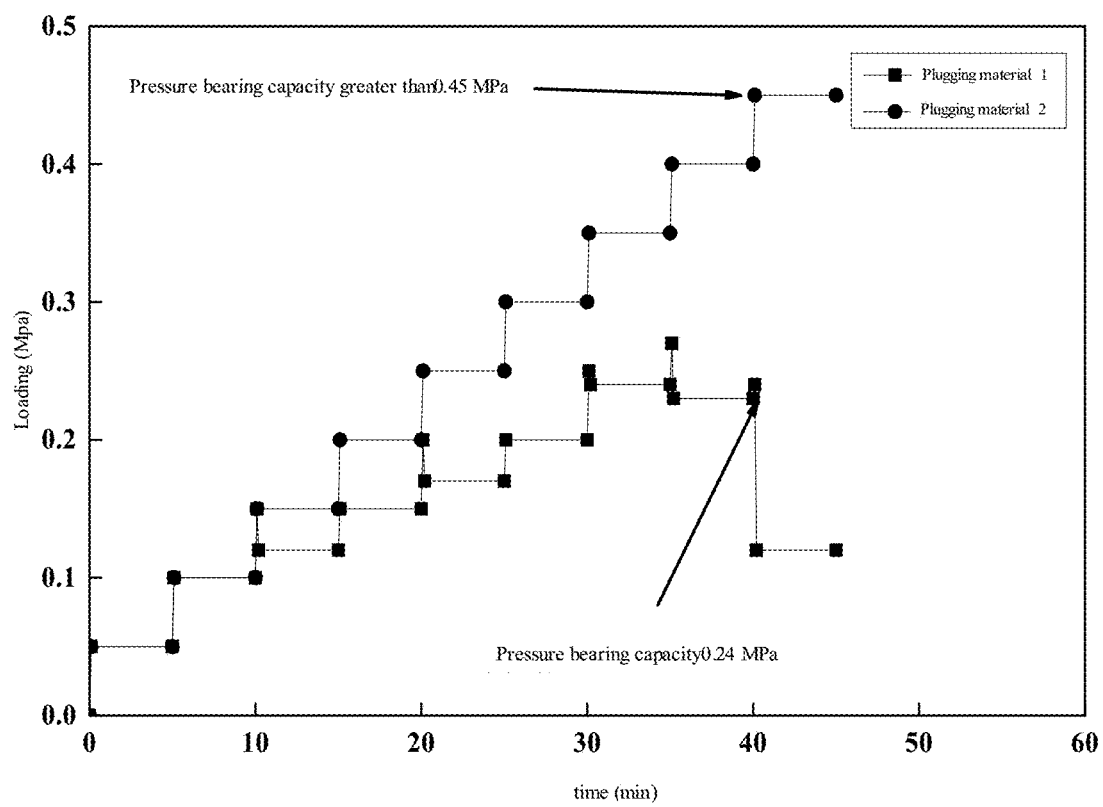
FIG. 1 is a schematic view of a loading curve of a plugging layer based on a photoelastic experiment method in accordance with an embodiment of the present disclosure.

In order to more clearly understand and implement the present disclosure for one of ordinary skill in the related art, the principles and characteristics of the present disclosure are described on the basis of these drawings and embodiments; the examples cited are provided only to interpret the present disclosure, but not to limit the scope of the present disclosure. Any variation or replacement made by one of ordinary skill in the related art without departing from the spirit of the present disclosure shall fall within the protection scope of the present disclosure.

Photoelasticity is configured to describe a variation of optical properties of photoelastic material under mechanical deformation, which can measure stress distribution of the photoelastic material. The present disclosure is provided for using the photoelastic material to simulate rigid plugging material, it is considered that the stress distribution of the two kinds of material is relatively consistent under a mechanical pressure. By studying the distribution of internal stress and pressure-bearing capacity of the photoelastic material under different sizes, shapes, combinations and fluid lubrication conditions, factors of the best optimal sizes, shapes, combinations and fluid lubrication of the rigid plugging material can be obtained, which provides a method for optimizing crack plugging material. The present disclosure can be further illustrated by specific embodiments below.

A First Embodiment

In order to verify reliability of the present disclosure, an oil and gas area in front of Kuqa Mountain in Tarim Basin is taken as an example, a problem of lost circulation is prominent due to high-angle fractures developed of the reservoir in the area. Calcium carbonate particles are used as common lost circulation material in the field. There are many microfactures of calcium carbonate particles on site, so that it is difficult to choose from them because of their different shapes. Polycarbonate is chosen as experimental material, which has the advantages of higher optical sensitivity and transparency, and low creep at a room temperature. Polycarbonate photoelastic material is made into two shapes, respectively with roundness of 0.75 and 0.90 respectively, which are denoted as simulated plugging material 1 and simulated plugging material 2. Due to a fact that particle size of the photoelastic material is too small in the photoelastic experiment to affect observation effect, so that an average radius of the two photoelastic materials prepared is 10 mm, which is denoted as the simulated material 1 and the simulated material 2. The specific steps are as follows:

Step (1) according to a laboratory-plugging-simulation experiment and a discrete-element-particle-flow-simulation experiment, an arrangement of structure material in a typical plugging layer mainly can be a random arrangement, a triangle arrangement and a square arrangement, etc. In an embodiment of the present disclosure, the random arrangement is selected and a shear load is as an applied load.

Step (2) recording photoelastic images, and monitoring a relation curve between an applied load and a time during a photoelastic experiment loading process, the curved is shown in FIG. 1. It can be seen from FIG. 1, the pressure-bearing capacity of the plugging material 1 is 0.24 MPa, and that of the plugging material 2 is greater than 0.45 MPa, thereby it is indicated that the plugging layer formed by the plugging material 2 has a better pressure-bearing capacity.

Figure 2:
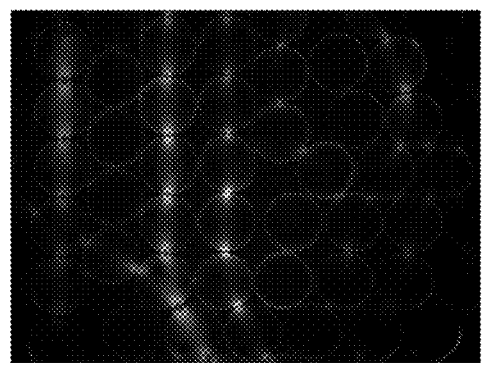
FIG. 2 is a photoelastic image before shear load is applied on the plugging layer formed by simulating plugging material 1 in accordance with an embodiment of the present disclosure.
Figure 3:
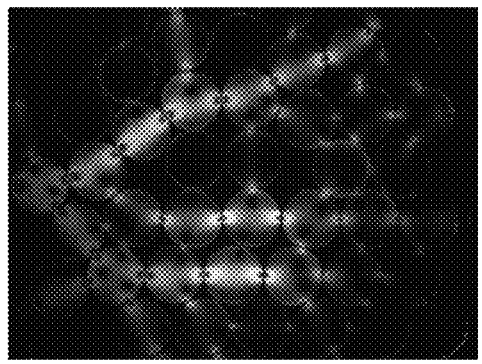
FIG. 3 is a photoelastic image under shear load is applied on the plugging layer formed by simulating the plugging material 1 in accordance with an embodiment of the present disclosure.
Figure 4:
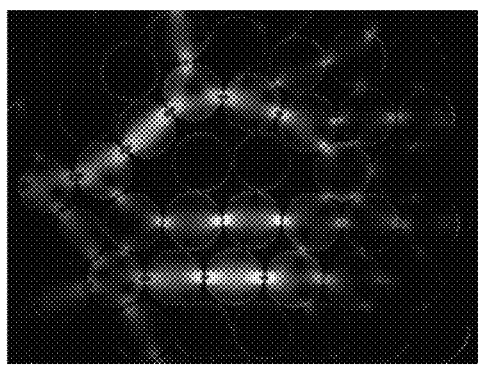
FIG. 4 is a photoelastic image after shear failure is applied on the plugging layer formed by simulating the plugging material 1 in accordance with an embodiment of the present disclosure.

Referring to FIG. 2, before a shear load is applied on the plugging material 1, the maximum load is only transferred from a few force chains along a horizontal direction. As the horizontal load is gradually increased, the number of the force chains along the horizontal direction can be also increased (shown in FIG. 3). When the horizontal load is increased to 0.24 MPa, a first failure of the plugging layer is occurred, brightness of the force chains in a whole particle system is decreased, and a local force chain is broken (FIG. 4), which is indicated that the plugging layer is damaged.

Step (3) according to the relation curve between the load and the time in the step (2), obtaining the pressure-bearing capacity of the plugging layer of simulated plugging material, and selecting the simulated plugging material according to the pressure-bearing capacity. According to the above experimental results and FIG. 1, under the same conditions, the pressure-bearing capacity of the plugging material with roundness of 0.90 is better than that of the plugging material with roundness of 0.75.

Figure 5:
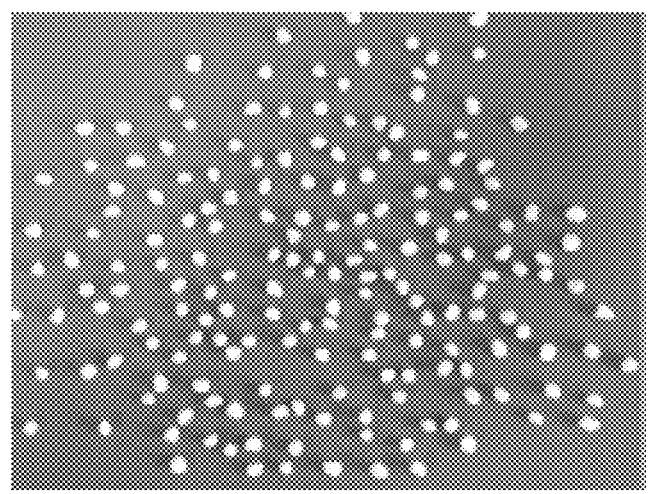
FIG. 5 is a morphologies schematic view of the plugging material 1 in accordance with an embodiment of the present disclosure.
Figure 6:
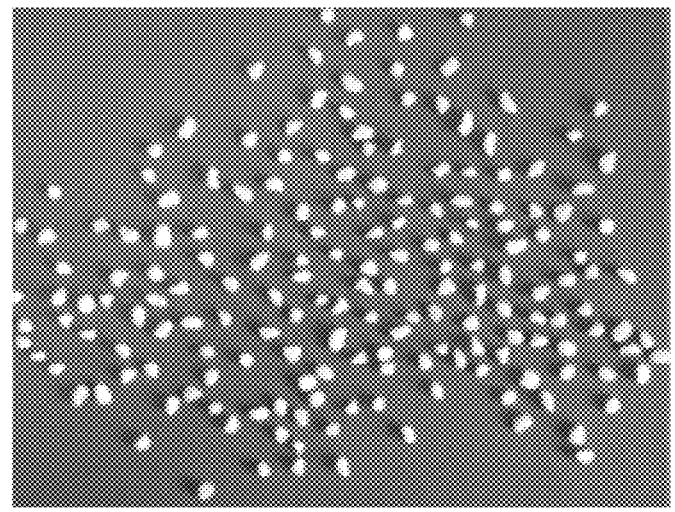
FIG. 6 is a morphologies schematic view of plugging material 2 in accordance with an embodiment of the present disclosure.
Figure 7:
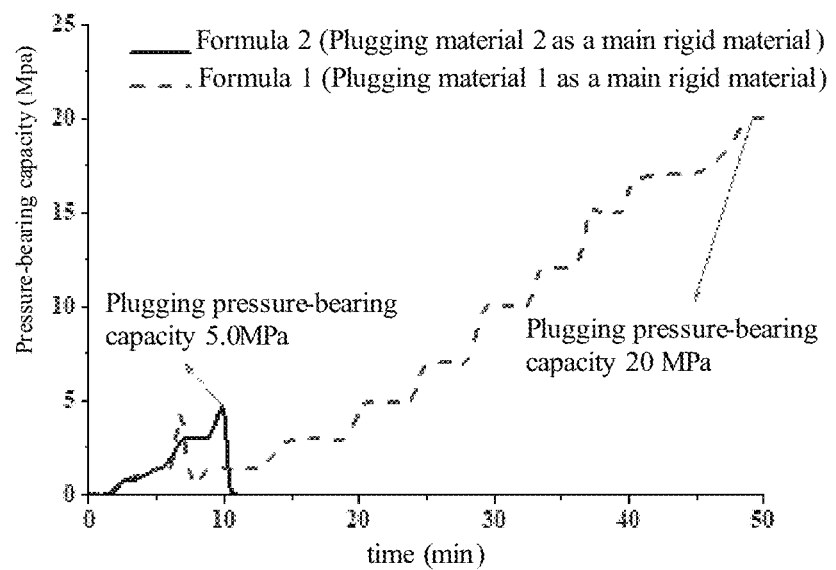
FIG. 7 is shown a schematic view of pressure-bearing capacity experiment curves of plugging formula formed by the plugging material 1 and the plugging material 2.

Step (4) in order to further verify that the plugging material screened out in the embodiment is indeed the preferred material, a plugging pressure-bearing capacity test of the two types of calcium carbonate particle plugging materials (respectively with roundness of 0.75 and 0.90) was carried out. Morphologies of the two plugging materials are respectively shown in FIG. 5 and FIG. 6. Wherein, FIG. 5 is the morphologies schematic view of the calcium carbonate particles with roundness of 0.90, and FIG. 6 is the morphologies schematic view of the calcium carbonate particles with roundness of 0.75. Final plugging-pressure test results are shown in FIG. 7, the optimal plugging material, namely the calcium carbonate particles with roundness of 0.9, the pressure-bearing capacity is more than 20 MPa. The pressure-bearing capacity of the calcium carbonate particles with roundness of 0.75 is 5.0 MPa, which is conformed to the experimental results of the present disclosure to prove the reliability of the method.

The above embodiment is only one of embodiments of the present disclosure, a combination of plugging material can also be determined by adjusting a combination of plugging material and other auxiliary material, and an optimum lubrication mode of the plugging material can also be determined by adjusting lubrication condition of fluid. Therefore, the above embodiments are only a description of the present disclosure and the foregoing description is not in any form a limitation to the present disclosure. Any variation or replacement made by one of ordinary skill in the related art without departing from the spirit of the present disclosure shall fall within the protection scope of the present disclosure.

What is claimed is:

1. A selection method of loss control materials for lost circulation control in fractured reservoirs based on photoelastic experiments comprising:
    step (1) selecting photoelastic material to simulate rigid plugging material;
    step (2) determining a shape, a particle size distribution, an addition, a type and an arrangement of the plugging material used in a photoelastic experiment, and performing the photoelastic experiment under a certain loading mode;
    step (3) recording photoelastic images, and monitoring a relation curve between an applied load and a time during a photoelastic experiment loading process;
    step (4) obtaining pressure-bearing capacity of a plugging layer of the plugging material, according to the relation curve of the load and the time in the step (3) above, and selecting the plugging material according to the pressure-bearing capacity.

2. The selection method as claimed in claim 1, wherein a particle size distribution, a material type and a proportional relation of the photoelastic experiment material are determined according to a particle size distribution, a material addition and a material type of common plugging material of deep fractured reservoirs.

3. The selection method as claimed in claim 1, wherein a loading mode of the photoelastic experiment is determined according to a stress instability mode of the fractured reservoirs.

4. The selection method as claimed in claim 1, wherein the arrangement of the photoelastic experimental material is arranged according to a typical plugging layer structure of cracks.

* * * * *